US008364764B2

(12) United States Patent
Hartselle et al.

(10) Patent No.: US 8,364,764 B2
(45) Date of Patent: *Jan. 29, 2013

(54) METHOD, SYSTEM, AND APPARATUS FOR PROVIDING SELF-DESTRUCTING ELECTRONIC MAIL MESSAGES

(75) Inventors: William A. Hartselle, Norcross, GA (US); Shannon M. Short, Atlanta, GA (US); Vernon Meadows, Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/061,008

(22) Filed: Apr. 2, 2008

(65) Prior Publication Data

US 2008/0281930 A1    Nov. 13, 2008

Related U.S. Application Data

(63) Continuation of application No. 10/042,854, filed on Jan. 9, 2002, now Pat. No. 7,356,564.

(51) Int. Cl.
  *G06F 15/16*    (2006.01)
(52) U.S. Cl. .......................... 709/206; 709/205; 709/207
(58) Field of Classification Search .................. 709/206, 709/205, 207
  See application file for complete search history.

(56) References Cited

U.S. PATENT DOCUMENTS

| | | |
|---|---|---|
| 5,559,800 A | 9/1996 | Mousseau |
| 5,958,005 A | 9/1999 | Thorne et al. ................. 709/202 |
| 6,014,688 A | 1/2000 | Venkatraman et al. ....... 709/206 |
| 6,023,700 A | 2/2000 | Owens |
| 6,044,275 A | 3/2000 | Boltz |
| 6,108,688 A | 8/2000 | Nielsen |
| 6,119,014 A | 9/2000 | Alperovich |
| 6,161,007 A | 12/2000 | McCutcheon |
| 6,219,694 B1 | 4/2001 | Lazaridis |
| 6,314,454 B1 | 11/2001 | Wang et al. .................... 709/206 |
| 6,324,569 B1 | 11/2001 | Ogilvie et al. ................ 709/206 |
| 6,487,586 B2 | 11/2002 | Ogilvie et al. ................ 709/206 |

(Continued)

FOREIGN PATENT DOCUMENTS

| | | |
|---|---|---|
| GB | 2350711 | 6/2000 |
| JP | 20003315 | 1/2000 |

(Continued)

OTHER PUBLICATIONS

Jordan; U.S. Appl. No. 09/965,781, filed Sep. 28, 2001.

(Continued)

*Primary Examiner* — Karen Tang

(57) ABSTRACT

A method, system, and apparatus for providing a self-destructing e-mail messages are described. An e-mail client application provides a user interface through which the sender of an e-mail message can enter the message and a time period for destruction of the message. Once the sender has provided this information, the e-mail client application sends a request to an e-mail server application to transmit the self-destructing e-mail message. The e-mail client application may also receive self-destructing e-mail messages. When a self-destructing e-mail message is received, the destruction date associated with the e-mail message is identified and the message is destroyed at the specified time. The e-mail client application can also limit the number and type of operations that may be performed on a self-destructing e-mail. An e-mail server application is also provided that receives requests from the e-mail client application to transmit self-destructing e-mail messages and perform other functions.

20 Claims, 10 Drawing Sheets

U.S. PATENT DOCUMENTS

| | | | |
|---|---|---|---|
| 6,601,088 B1 | 7/2003 | Kelley | |
| 6,628,935 B1 | 9/2003 | Lawrence | |
| 6,654,786 B1 * | 11/2003 | Fox et al. | 709/203 |
| 6,701,347 B1 | 3/2004 | Ogilvie | 709/206 |
| 6,711,608 B1 * | 3/2004 | Ogilvie | 709/206 |
| 6,754,484 B1 | 6/2004 | Hiltunen | |
| 6,757,713 B1 * | 6/2004 | Ogilvie et al. | 709/206 |
| 6,772,143 B2 | 8/2004 | Hung | |
| 7,107,042 B1 | 9/2006 | Jordan | |
| 7,117,248 B1 | 10/2006 | Jordan | |
| 7,356,564 B2 | 4/2008 | Hartselle | |
| 2001/0007993 A1 | 7/2001 | Wu | |
| 2001/0030960 A1 * | 10/2001 | Nakada et al. | 370/389 |
| 2002/0188515 A1 | 12/2002 | Nakata | |
| 2003/0023693 A1 | 1/2003 | Nakamura | |
| 2003/0131060 A1 | 7/2003 | Hartselle | |
| 2004/0103162 A1 * | 5/2004 | Meister et al. | 709/206 |

FOREIGN PATENT DOCUMENTS

| | | |
|---|---|---|
| WO | 03/002470 | 8/2004 |

OTHER PUBLICATIONS

Jordan; U.S. Appl. No. 11/113,764, filed Apr. 25, 2005.
Hartselle; U.S. Appl. No. 10/042,854, filed Jan. 9, 2002.
Jordan; U.S. Appl. No. 09/965,783, filed Sep. 28, 2001.
Jordan; U.S. Appl. No. 09/965,782, filed Sep. 28, 2001.
Jordan; Final Rejection mailed Oct. 21, 2004 for U.S. Appl. No. 09/965,781, filed Sep. 28, 2001.
Jordan; Non-Final Rejection mailed Mar. 18, 2004 U.S. Appl. No. 09/965,781, filed Sep. 28, 2001.
Jordan; Non-Final Rejection mailed Jul. 14, 2005 U.S. Appl. No. 09/965,781, filed Sep. 28, 2001.
Jordan; Notice of Allowance and Fees Due mailed Apr. 6, 2006 for U.S. Appl. No. 09/965,781, filed Sep. 28, 2001.
Jordan; Notice of Allowance and Fees Due mailed Nov. 3, 2005 U.S. Appl. No. 09/965,781, filed Sep. 28, 2001.
Jordan; Notice of Allowance and Fees Due mailed Feb. 10, 2005 U.S. Appl. No. 09/965,781, filed Sep. 28, 2001.
Jordan; Advisory Action mailed Sep. 16, 2008 for U.S. Appl. No. 11/113,764, filed Apr. 25, 2005.
Jordan; Final Rejection mailed Oct. 26, 2007 for U.S. Appl. No. 11/113,764, filed Apr. 25, 2005.
Jordan; Non-Final Rejection mailed Mar. 22, 2007 for U.S. Appl. No. 11/113,764, filed Apr. 25, 2005.
Jordan; Non-Final Rejection mailed Jul. 11, 2007 for U.S. Appl. No. 11/113,764, filed Apr. 25, 2005.
Jordan; Non-Final Rejection mailed Dec. 11, 2006 for U.S. Appl. No. 11/113,764, filed Apr. 25, 2005.
Jordan; Examiner Interview Summary mailed Apr. 11, 2005 for U.S. Appl. No. 09/965,782, filed Sep. 28, 2001.
Jordan; Examiner Interview Summary mailed Jul. 17, 2006 for U.S. Appl. No. 09/965,782, filed Sep. 28, 2001.
Jordan; Final Rejection mailed Dec. 2, 2005 for U.S. Appl. No. 09/965,782, filed Sep. 28, 2001.
Jordan; Non-Final Rejection mailed Feb. 9, 2005 for U.S. Appl. No. 09/965,782, filed Sep. 28, 2001.
Jordan; Non-Final Rejection mailed Jun. 16, 2005 for U.S. Appl. No. 09/965,782, filed Sep. 28, 2001.
Jordan; Notice of Allowance and Fees Due mailed Jul. 17, 2006 for U.S. Appl. No. 09/965,782, filed Sep. 28, 2001.
Hartselle; Final Rejection mailed Aug. 9, 2005 for U.S. Appl. No. 10/042,854, filed Jan. 9, 2002.
Hartselle; Final Rejection mailed Aug. 30, 2007 for U.S. Appl. No. 10/042,854, filed Jan. 9, 2002.
Hartselle; Final Rejection mailed Sep. 26, 2006 for U.S. Appl. No. 10/042,854, filed Jan. 9, 2002.
Hartselle; Non-Final Rejection mailed Mar. 2, 2006 for U.S. Appl. No. 10/042,854, filed Jan. 9, 2002.
Hartselle; Non-Final Rejection mailed Apr. 17, 2007 for U.S. Appl. No. 10/042,854, filed Jan. 9, 2002.
Hartselle; Non-Final Rejection mailed Apr. 20, 2005 for U.S. Appl. No. 10/042,854, filed Jan. 9, 2002.
Hartselle; Notice of Allowance and Fees Due mailed Jan. 31, 2008 for U.S. Appl. No. 10/042,854, filed Jan. 9, 2002.

* cited by examiner

METHOD, SYSTEM, AND APPARATUS FOR PROVIDING SELF-DESTRUCTING ELECTRONIC MAIL MESSAGES

RELATED APPLICATIONS

This application is a continuation of U.S. application Ser. No. 10/042,854 entitled "Method, System, and Apparatus for Providing Self-Destructing Electronic Mail Messages" filed Jan. 9, 2002, which issued on Apr. 8, 2008 as U.S. Pat. No. 7,356,564, which is incorporated herein by reference.

TECHNICAL FIELD

The present invention generally relates to the field of electronic messaging. More specifically, the present invention relates to the field of providing electronic mail messages that self-destruct after a specified time period has elapsed.

BACKGROUND

Electronic mail ("e-mail") has become a pervasive method of communication for many computer users worldwide. Because e-mail provides a quick and easy method of communication that was not previously possible, e-mail is now commonly used in the home and in the workplace to send all types of communications ranging from trivial notes to highly sensitive business communications. However, although conventional e-mail systems are fast and convenient, these systems are not suitable for transmitting all types of information.

For instance, the ease with which e-mail messages may be forwarded, saved, and otherwise distributed make conventional e-mail systems inappropriate for highly confidential or proprietary information. Moreover, in conventional e-mail systems the sender of an e-mail message cannot restrict the operations that may be subsequently performed on an e-mail message. Therefore, once an e-mail message has been sent, the message may be subsequently forwarded to other e-mail users, printed, saved, copied, moved, and otherwise replicated. The inability to control the number and type of operations that may be subsequently performed on a sent e-mail message makes conventional e-mail systems unsuitable for sending confidential information for which absolute control of distribution is a necessity.

Conventional e-mail systems may also be inappropriate for sending confidential or proprietary information because these systems do not allow the sender of an e-mail message to control the lifespan of the e-mail message. E-mail messages may, therefore, languish in a recipient's e-mail "in-box" or on an e-mail server computer for months or even years. Some e-mail systems will allow an e-mail recipient to specify that messages should be deleted after a certain amount of time. However, these systems do not allow the sender to specify a time for destruction of the sent e-mail message. Therefore, an e-mail sender cannot be certain that a sent e-mail message containing time sensitive information will ever be deleted.

Therefore, in light of the above-described problems, there is a need for a method, system, and apparatus for providing self-destructing e-mail messages that allows a user to specify a time for the destruction of a sent e-mail message and that will destroy all instances of the e-mail message when the specified time arrives. Moreover, there is a need for a method, system, and apparatus for providing self-destructing e-mail messages that restricts the number and type of operations that may be subsequently performed on a sent e-mail message, thereby restricting the ability of a recipient to replicate the message.

SUMMARY

Embodiments of the present invention solve the above-described problems by providing a method, system, and apparatus for providing self-destructing e-mail messages that allow a time to be specified for the destruction of a sent e-mail message and that destroy all instances of the e-mail message when the specified time arrives. Moreover, embodiments of the present invention also provide a method, system, and apparatus for providing self-destructing e-mail messages that restrict the number of operations that may be subsequently performed on a sent e-mail message. For instance, operations for saving, forwarding, printing, copying, or otherwise duplicating the e-mail message may be prohibited.

Generally described, one embodiment of the present invention comprises a system for providing self-destructing and operation-limited e-mail messages. The system provided according to this embodiment comprises an e-mail client application program for sending and receiving self-destructing e-mail messages. The e-mail client application provides a user interface for sending self-destructing e-mail messages. In particular, when a sender requests to send a self-destructing e-mail message, the sender is prompted for the conventional information necessary to send an e-mail message such as the recipient's e-mail address, e-mail addresses for carbon copy or blind carbon copy recipients, a subject for the e-mail message, and an e-mail message body. Additionally, the sender is prompted to identify a period of time within which the e-mail message should be destroyed.

In various embodiments of the present invention, the period of time within which the e-mail message should be destroyed may be specified as an elapsed period of time measured from the time the e-mail message is sent. Alternatively, the sender may specify a particular date on which the message should be destroyed. The sender may also specify that the e-mail message be deleted as soon as it has been opened and closed by the recipient. In various embodiments, the sender may specify that a return receipt be provided when the recipient has read the message and that a confirmation e-mail message be provided to the recipient when the e-mail message has been deleted. In this manner, a sender can learn when a message has been received and a recipient can learn of the existence of an e-mail message that was deleted before they had an opportunity to read it.

Once the sender has specified each of the options for the e-mail message to be sent, the e-mail client application sends a request to an e-mail server application to send the e-mail message as a self-destructing e-mail message. The request includes the message body and delivery information, including the selected destruction date, return receipt, and confirmation e-mail options. The self-destructing e-mail message is then delivered by the e-mail server application to the appropriate recipients.

In the embodiments of the present invention described herein, the e-mail client application may also receive self-destructing e-mail messages. In particular, the e-mail client application may receive self-destructing e-mail messages from the e-mail server application. If the e-mail client application receives a self-destructing e-mail message from the e-mail server computer, the e-mail client application identifies the destruction date associated with the e-mail message and destroys the e-mail message at the specified time. The e-mail message will be destroyed by the e-mail client application whether or not the message has been read. Alternatively, if the e-mail message specifies that it should be deleted after it has been read, the e-mail client application will destroy the e-mail message once it has been opened and closed by the recipient. All instances of the e-mail message are deleted from the recipient's computer.

According to one embodiment of the present invention, the e-mail client application is also operative to limit the number and type of operations that may be performed on a self-destructing e-mail. For instance, when a request is made by the recipient to perform an operation on the e-mail message, the e-mail client application may determine if the operation is permitted. If the operation is not permitted, the e-mail client application may prohibit the operation from being performed on the e-mail message. In this manner, the e-mail client application may prevent operations from being performed on self-destructing e-mail messages such as printing, forwarding, saving, moving, or other types of operations for duplicating the content of the e-mail message.

The system provided according to one embodiment of the present invention also includes an e-mail server application. According to various embodiments of the present invention, the e-mail server application receives requests from the e-mail client application to transmit self-destructing e-mail messages. The e-mail server application receives such requests and sends the self-destructing e-mail messages to the intended recipients. Additionally, the e-mail server application may monitor the destruction dates for received messages and destroy any instances of self-destructing e-mail messages contained on an e-mail server computer when the specified dates arrive. Additionally, the e-mail server application may instruct the e-mail client application to destroy e-mail messages and may transmit a confirmation e-mail message to the intended recipient of a destroyed message when the message is deleted.

Various embodiments of the present invention also provide a method, a computer-controlled apparatus, and a computer-readable medium for providing self-destructing e-mail messages. Additional aspects of the various embodiments of the present invention will be described further with reference to the Detailed Description that follows.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
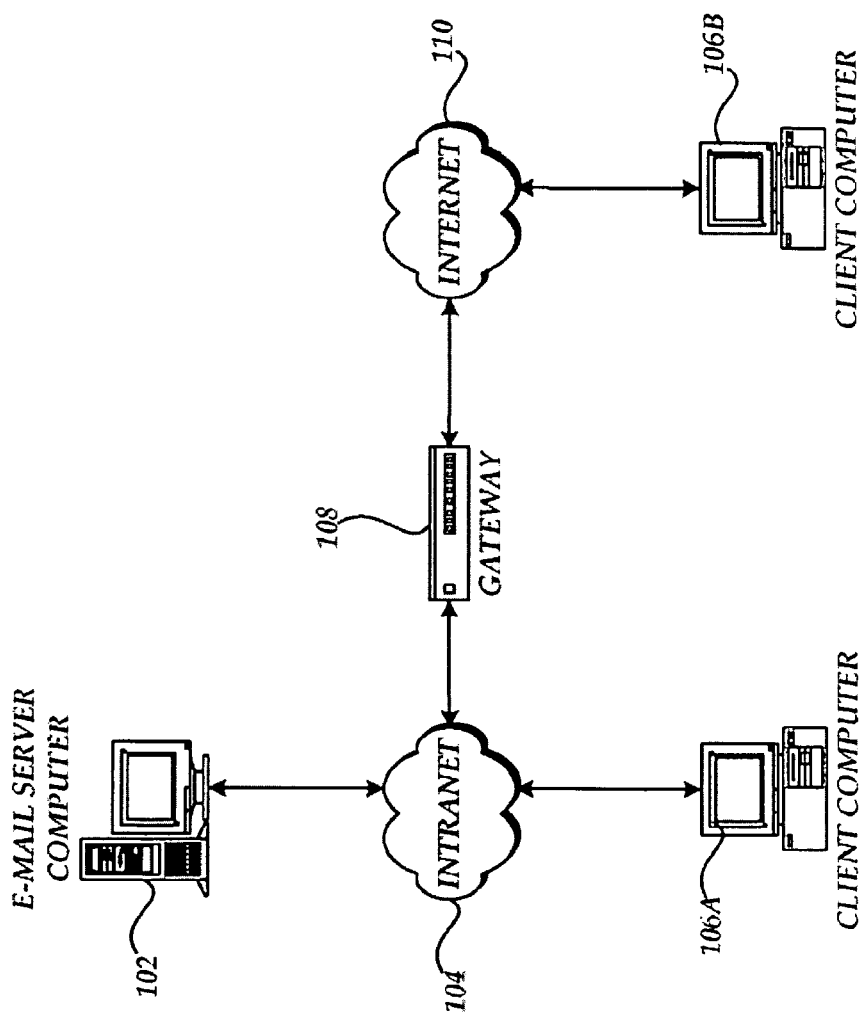
FIG. 1 is a block diagram showing an illustrative operating environment and network architecture utilized in an embodiment of the present invention.

In the following detailed description, reference is made to the accompanying drawings which form a part hereof, and in which is shown by way of illustration specific embodiments or examples. These embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined by the appended claims and their equivalents. As described briefly above, embodiments of the present invention include a method, system and apparatus for providing self-destructing e-mail messages. Referring now to FIG. 1, an illustrative operating environment and network architecture for implementing the various embodiments of the present invention will be described. As shown in FIG. 1, an e-mail server computer 102 and a client computer 106A are connected via an intranet 104. The client computer 106A comprises a standard personal computer having a network connection and operative to communicate with the e-mail server computer 102 via the intranet 104. The client computer 106A also includes an e-mail client application program configured for sending and receiving self-destructing e-mail messages. The e-mail client application may also be configured for sending and receiving non self-destructing e-mail messages and for performing other types of functions typically associated with e-mail client application programs. Additional details regarding the operation of the client computer 106A are described below with reference to FIGS. 3-9.

The e-mail server computer 102 comprises a standard network server computer connected to the intranet 104. The e-mail server computer 102 may also be connected to an extranet, such as the Internet 110, through the gateway device 108. As known to those skilled in the art, the gateway device 108 provides an interface between the intranet 104 and another network, such as the Internet 110. The e-mail server computer 102 is also operative to execute an e-mail server application program for storing and forwarding self-destructing e-mail messages. The e-mail server application may also provide other services with respect to self-destructing e-mail messages such as providing e-mail messages confirming the deletion of a self-destructing e-mail message, providing requests to e-mail client applications to destroy self-destructing e-mail messages, and other functions. Additionally, the e-mail server application may store and forward self-destructing e-mail messages and non self-destructing e-mail messages to computers connected to the intranet 104, such as the client computer 106A, and to computers connected to external networks, such as the client computer 106B. Additional details regarding the operation of the e-mail server computer 102 are provided below with respect to FIGS. 2 and 10.

Figure 2:
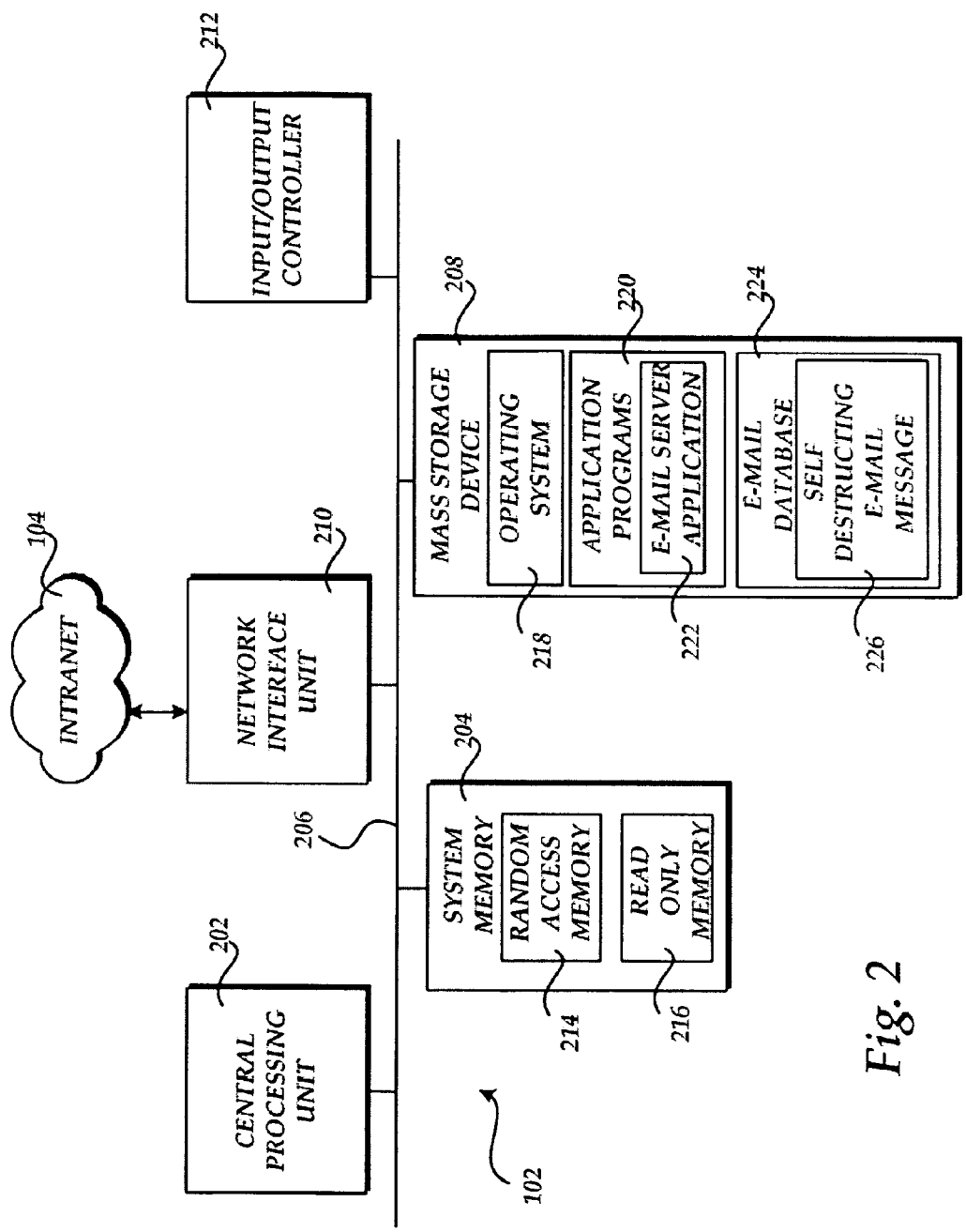
FIG. 2 is a block diagram illustrating a computer architecture for an e-mail server computer provided according to one embodiment of the present invention.

Referring now to FIG. 2, an illustrative computer architecture for the e-mail server computer 102 will be described. The computer architecture shown in FIG. 2 illustrates a conventional network-capable computer system, including a central processing unit 202 ("CPU"), a system memory 204, including a random access memory 214 ("RAM") and a read-only memory ("ROM") 216, and a system bus 206 that couples the memory to the CPU 202. A basic input/output system ("BIOS") containing the basic routines that help to transfer information between elements within the e-mail server computer 102, such as during startup, is stored in the ROM 216. The e-mail server computer 102 further includes a mass storage device 208 for storing an operating system 218 and application programs 220.

The mass storage device 208 is connected to the CPU 202 through a mass storage controller (not shown) connected to the bus 206. The mass storage device 208 and its associated computer-readable media provide non-volatile storage for the e-mail server computer 102. Although the description of computer-readable media contained herein refers to a mass storage device, such as a hard disk or CD-ROM drive, it should be appreciated by those skilled in the art that computer-readable media can be any available media that can be accessed by the e-mail server computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the e-mail server computer 102.

As described briefly above, the e-mail server computer 102 connects to the intranet 104 or other type of network through a network interface unit 210 connected to the bus 206. The e-mail server computer 102 may also include an input/output controller 212 for receiving and processing input from a number of devices, including a keyboard or mouse. Similarly, the input/output controller 212 may provide output to a display screen, a printer, or other type of output device.

A number of program modules may be stored in the mass storage device 208 and RAM 214 of the e-mail server computer 102, including an operating system 218 suitable for controlling the operation of a networked computer system, such as the UNIX operating system, the SOLARIS operating system from SUN MICROSYSTEMS, or the WINDOWS 2000 operating system from MICROSOFT CORPORATION of Redmond, Wash. The mass storage device 208 and RAM 214 may also store one or more application programs 220. In particular, the mass storage device 208 and RAM 214 may store an e-mail server application program 222, an e-mail database 224, and one or more self-destructing e-mail messages 226.

The e-mail server application 222 provides functionality for storing and forwarding self-destructing e-mail messages 226 and non self-destructing e-mail messages. As mentioned above, the e-mail server application 222 may also provide other services with respect to self-destructing e-mail messages such as providing e-mail messages confirming the deletion of a self-destructing e-mail message 226, providing requests to e-mail client applications to destroy self-destructing e-mail messages, and other functions. In order to provide this functionality, the e-mail server application 222 maintains an e-mail database 224 for storing self-destructing e-mail messages. The e-mail server application 222 may also maintain other databases and tables for providing self-destructing e-mail messages. Additional details regarding the operation of the e-mail server application 222 will be provided below with reference to FIG. 10.

Figure 3:
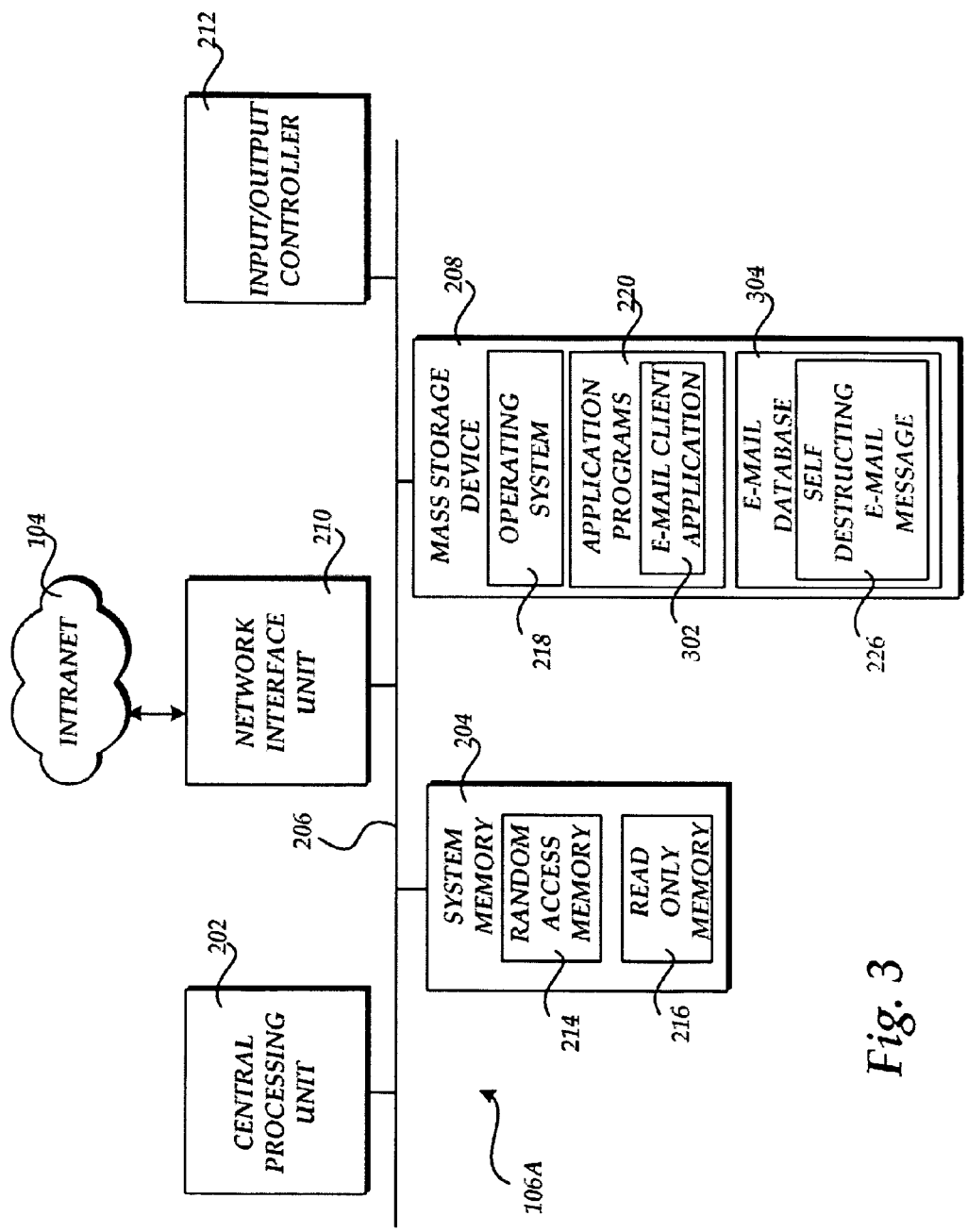
FIG. 3 is a block diagram illustrating a computer architecture for an e-mail client computer utilized in an embodiment of the present invention.

Referring now to FIG. 3, an illustrative computer architecture for an e-mail client computer 106A utilized in various embodiments of the present invention will be described. The e-mail client computer 106A comprises a standard personal computer capable of sending and receiving e-mail messages over a computer network. As shown in FIG. 3, the e-mail client computer 106A includes many of the convention computer components utilized in the e-mail server computer 102, including a CPU 202, a network interface unit 210 for connecting to an intranet 104 or other type of network, a system memory 204 and a mass storage device 208. The mass storage device 208 and RAM 214 also includes an operating system 218 suitable for controlling the operation of a standard personal computer, such as the WINDOWS 2000 or WINDOWS ME operating systems from MICROSOFT CORPORATION of Redmond, Wash.

The mass storage device 208 and RAM 214 may also store an e-mail client application 302 and an e-mail database 304 containing one or more self-destructing e-mail messages 226. As will be described in greater detail below, the e-mail client application 302 is operative to send and receive self-destructing e-mail messages 226. Moreover, the e-mail client application 302 may limit the number and type of operations that may be performed on self-destructing e-mail messages. For instance, the e-mail client application 302 may prohibit a user from saving, copying, printing, or otherwise duplicating the self-destructing e-mail messages 226 stored at the client computer 106A. Additional details regarding the operation of the e-mail client application 302 will be described with reference to FIGS. 4-9, below.

Figure 4:
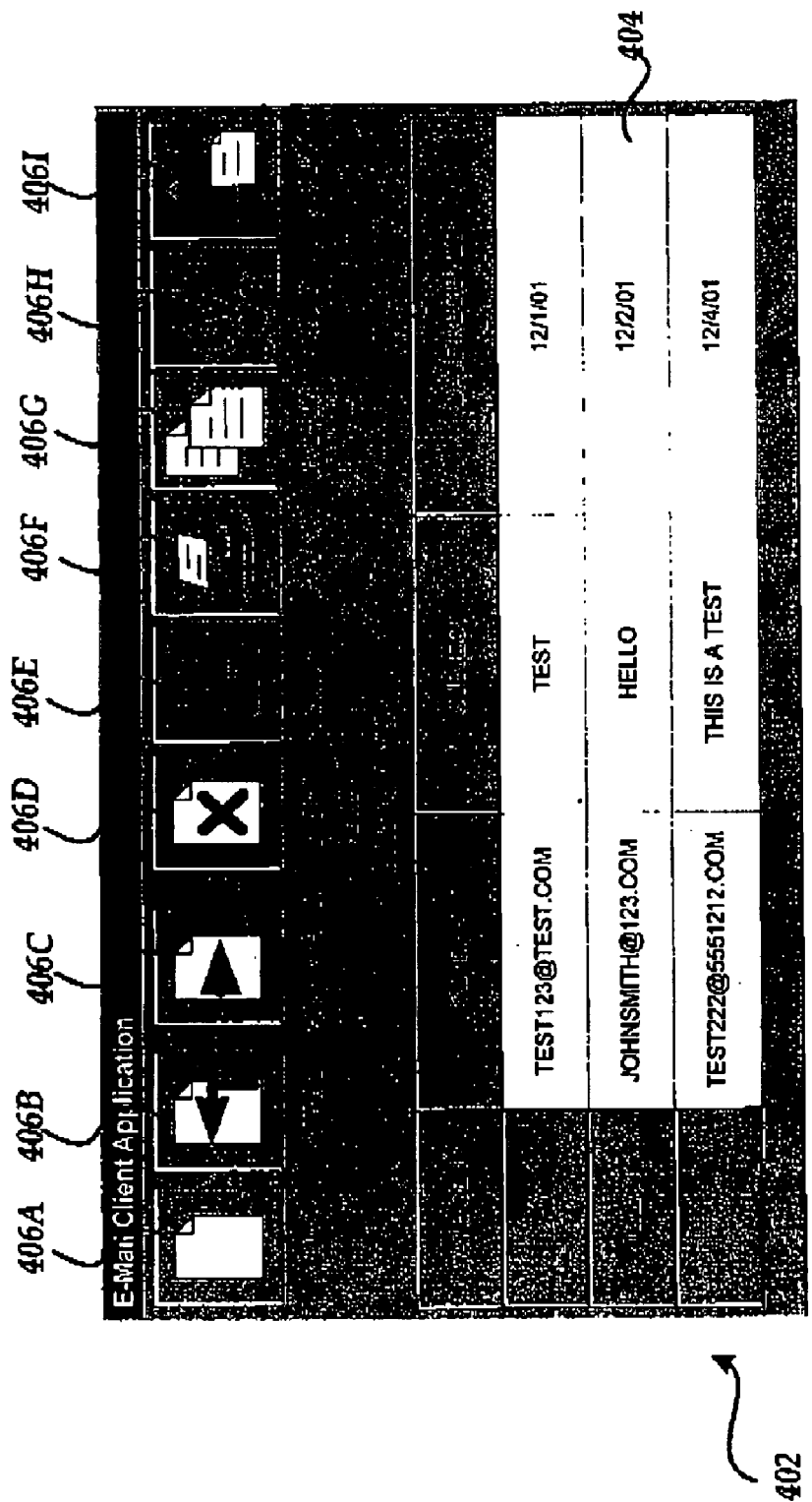
FIG. 4 is a user interface diagram illustrating a user interface for an e-mail client application provided in an embodiment of the present invention.

Referring now to FIG. 4, a user interface diagram illustrating a user interface provided in an embodiment of the e-mail client application 302 will be described. As shown in FIG. 4, the e-mail client application 302 provides a user interface window 402 that may be utilized to send, receive and perform other functions on e-mail messages. In particular, the user interface window 402 includes a received e-mail list 404. The received e-mail list 404 identifies the date sent, the sender, the subject, and the date received for e-mail messages received at the client computer 106A. Other information regarding these e-mail messages may be similarly provided.

The user interface window 402 also includes a number of user interface buttons 406A-406I for creating new e-mail messages and for performing operations on received e-mail messages. In particular, user interface button 406A allows a user to create a new e-mail message in a conventional manner. The user interface buttons 406B and 406C allow a user to reply to or forward an e-mail message, respectively. The user interface buttons 406E-406I allow e-mail messages to be saved, printed, pasted from a clipboard, cut, or copied to a clipboard, respectively.

Accordingly to one embodiment of the present invention, the e-mail client application 302 restricts the set of operations that may be performed on a self-destructing electronic mail message selected in the received e-mail list 404. For instance, if a self-destructing e-mail message is selected in the received e-mail list 404, the user interface buttons 406B, 406C, 406E, 406F, 406G, 406H, and 406I may be made unavailable thereby preventing a user from performing any of these operations on the self-destructing e-mail message. In this manner, the e-mail client application 302 can prohibit the duplication of the selected message through forwarding, saving, moving, copying, cutting, printing, or pasting. Moreover, the e-mail client application 302 may instruct the operating system 218 to prevent a screen display containing a self-destructing e-mail message from being captured or printed. It should be appreciated that the group of operations that the e-mail client application 302 restricts from being executed on a self-destructing e-mail message described herein is merely illustrative and that other operations that result in the duplication of all or a part of an e-mail message may be similarly prohibited.

Figure 5:
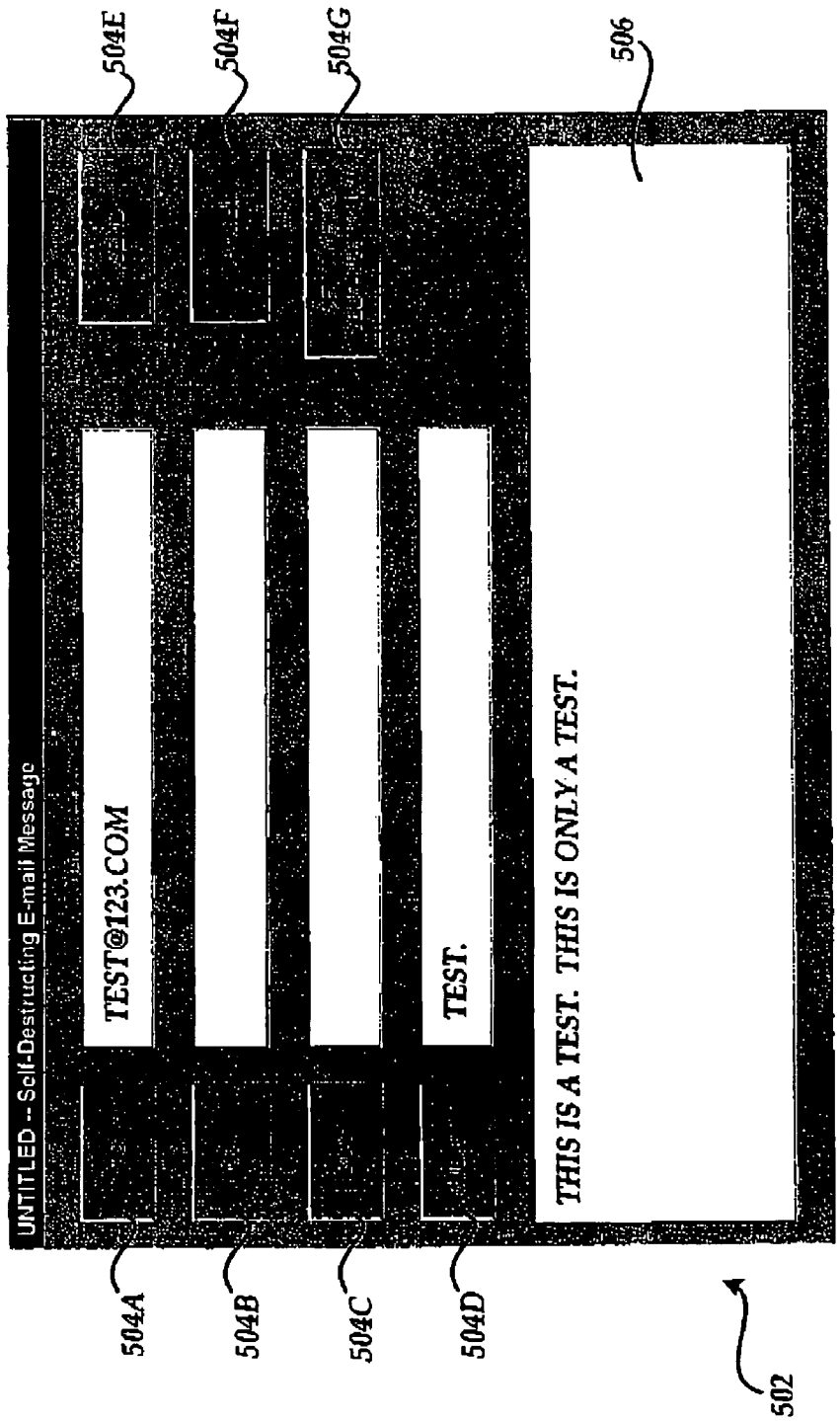
FIG. 5 is a user interface diagram showing a user interface for sending a self-destructing e-mail message in an embodiment of the present invention.

As shown in FIG. 4, the user interface window 402 also includes a user interface button 406D for sending a new self-destructing e-mail message. Selection of the user interface button 406D by a user allows the user to specify a group of recipients for the self-destructing e-mail message and a time period within which the self-destructing e-mail message should be destroyed. FIG. 5 shows a user interface provided by the e-mail client application 302 for creating a new self-destructing e-mail message.

Referring now to FIG. 5, an illustrative user interface for sending a new self-destructing e-mail message will be described. As shown in FIG. 5, the e-mail client application 302 displays a user interface window 502 in response to the selection of the user interface button 406D for creating a new self-destructing e-mail message. As shown in FIG. 5, the user interface window 502 includes conventional buttons 504A-504D for selecting the primary recipients, carbon copy recipients, blind carbon copy recipients, and subject for the new self-destructing e-mail message. The user interface window 502 also contains a field 506 for providing the message body. The user interface window 502 also includes user interface buttons 504E and 504F for sending the new message or canceling the message, respectively. Additionally, the user interface window 502 includes a user interface button 504 for allowing the user to select the time period within which the self-destructing electronic mail message should be destroyed. If the user selects the user interface button 504G, the user is presented with a user interface window 602 for selecting the time period for destruction of the e-mail message.

Figure 6:
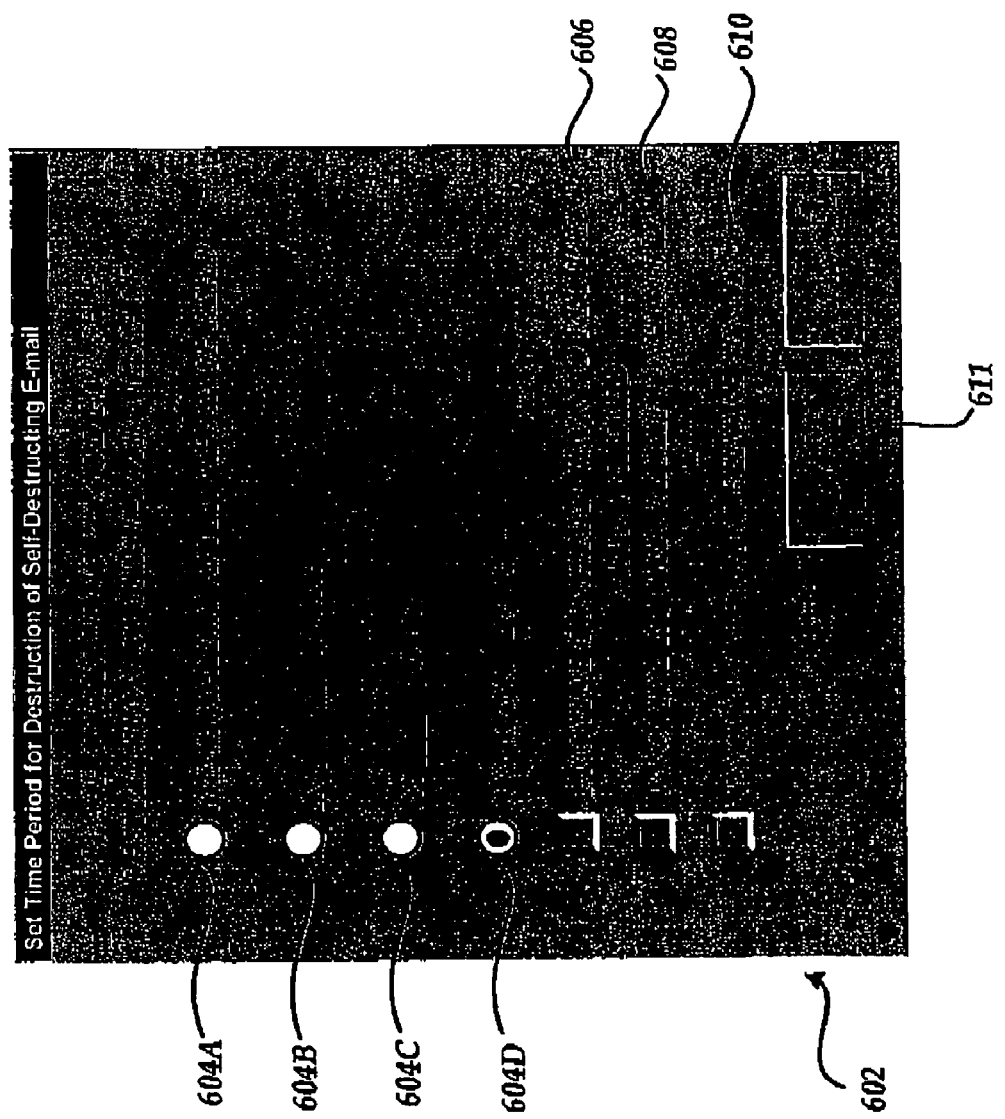
FIG. 6 is a user interface diagram showing a user interface for setting a time period for the destruction of a self-destructing e-mail message in an embodiment of the present invention.

Referring now to FIG. 6, a user interface window 602 will be described that allows a sender to set the time period for the destruction of a self-destructing e-mail message. As shown in FIG. 6, a number of radio buttons 604A-604D are provided that allow a user to select options relating to the time period within which a self-destructing e-mail message should be destroyed. The radio button 604A allows the user to indicate that the self-destructing e-mail message should be destroyed after it has been read on the e-mail client application 302.

For instance, the message may be destroyed after it has been opened and closed by the recipient. Alternatively, the e-mail client application 302 may wait a predetermined amount of time after the message has been closed before deleting it. The radio button 604B allows the user to indicate that the self-destructing e-mail message should be destroyed in a user-specified number of hours. The radio button 604C similarly allows the user to specify that the self-destructing e-mail message should be destroyed within a specified number of days. The radio button 604D allows the user to specify a particular date on which the self-destructing e-mail message should be destroyed. The new self-destructing e-mail message will be destroyed from the recipient's e-mail client application 302 and computer system according to the options selected here by the user utilizing radio buttons 604A-604D.

The user interface window 602 also provides several other options relating to the new self-destructing e-mail message. In particular, option 606 allows the sender to specify that a confirmation e-mail message should be sent from the e-mail server computer 102 to the recipient when the self-destructing e-mail message has been deleted. According to one embodiment of the present invention, the confirmation e-mail includes the identity of the sender of the original self-destructing e-mail message and an indication that the self-destructing e-mail message was sent but destroyed. In this manner, a recipient may be notified that a self-destructing e-mail message was received and destroyed even though the recipient never saw the message. The confirmation message includes only non-confidential information and does not include the message body or attachments originally included with the self-destructing e-mail message.

Selection of the option 608 allows the sender to indicate whether or not a return receipt should be provided to the sender when the recipient has read the self-destructing e-mail message. The return receipt may also provide a confirmation that the self-destructing e-mail message has been deleted from the recipient's computer. Additionally, option 610 allows the sender to indicate that the self-destructing e-mail message should be encrypted prior to being sent. According to one embodiment of the present invention, the e-mail client application 302 has the capability of decrypting encrypted self-destructing e-mail messages. In this manner, a self-destructing e-mail message that was transmitted to an e-mail client application not configured to receive self-destructing e-mail messages would be unreadable. Once the user has completed the selection of the time period within which the self-destructing e-mail message should be destroyed and the other delivery options, the user may return to the user interface window 502 shown in FIG. 5 by selecting the "done" button 611.

Figure 7:
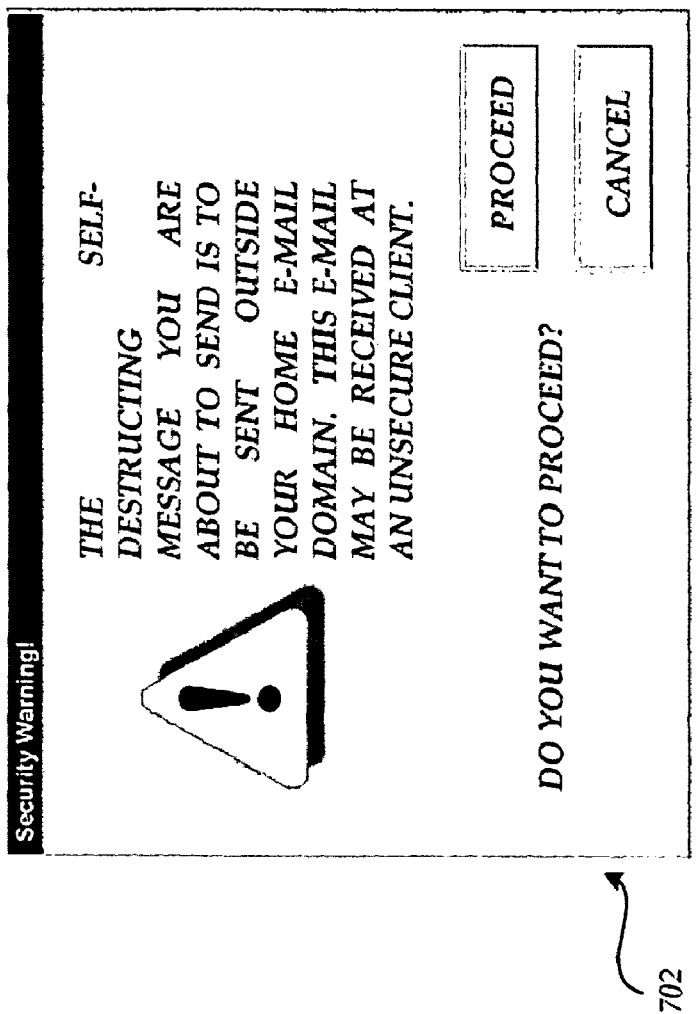
FIG. 7 is a user interface diagram showing a dialog box for providing a security warning in an embodiment of the present invention.

When the user has completed the forms of the user interface window 502 shown in FIG. 5, the user may select the user interface button 504E to send the message. Prior to sending the message, the e-mail client application 302 may determine whether any of the intended recipients are located on a network physically or logically beyond the sender's home e-mail domain. For instance, if the user's home e-mail address is "user@bellsouth.com", the e-mail client application 302 would determine whether any of the intended recipient's e-mail addresses are located at a domain other than "bellsouth.com." In the event that the e-mail client application 302 determines that one or more of the intended recipients is located on a network beyond the sender's home domain, the security warning message shown in FIG. 7 is displayed. As shown in FIG. 7, the user interface window 702 includes a security warning message that indicates to the sender that an intended recipient of the self-destructing e-mail message is located beyond a home domain associated with the e-mail server application 222. The user is then given the option to proceed with sending the self-destructing e-mail message or canceling the e-mail message. In this manner, the distribution of the self-destructing e-mail message to an e-mail system beyond the sender's home domain may be monitored and controlled by the user. This allows the user to ensure that the e-mail client application 302 that receives the self-destructing e-mail message supports the features described herein and that the self-destructing e-mail message will be destroyed by the e-mail client application 302 as specified by the user.

Figure 8:
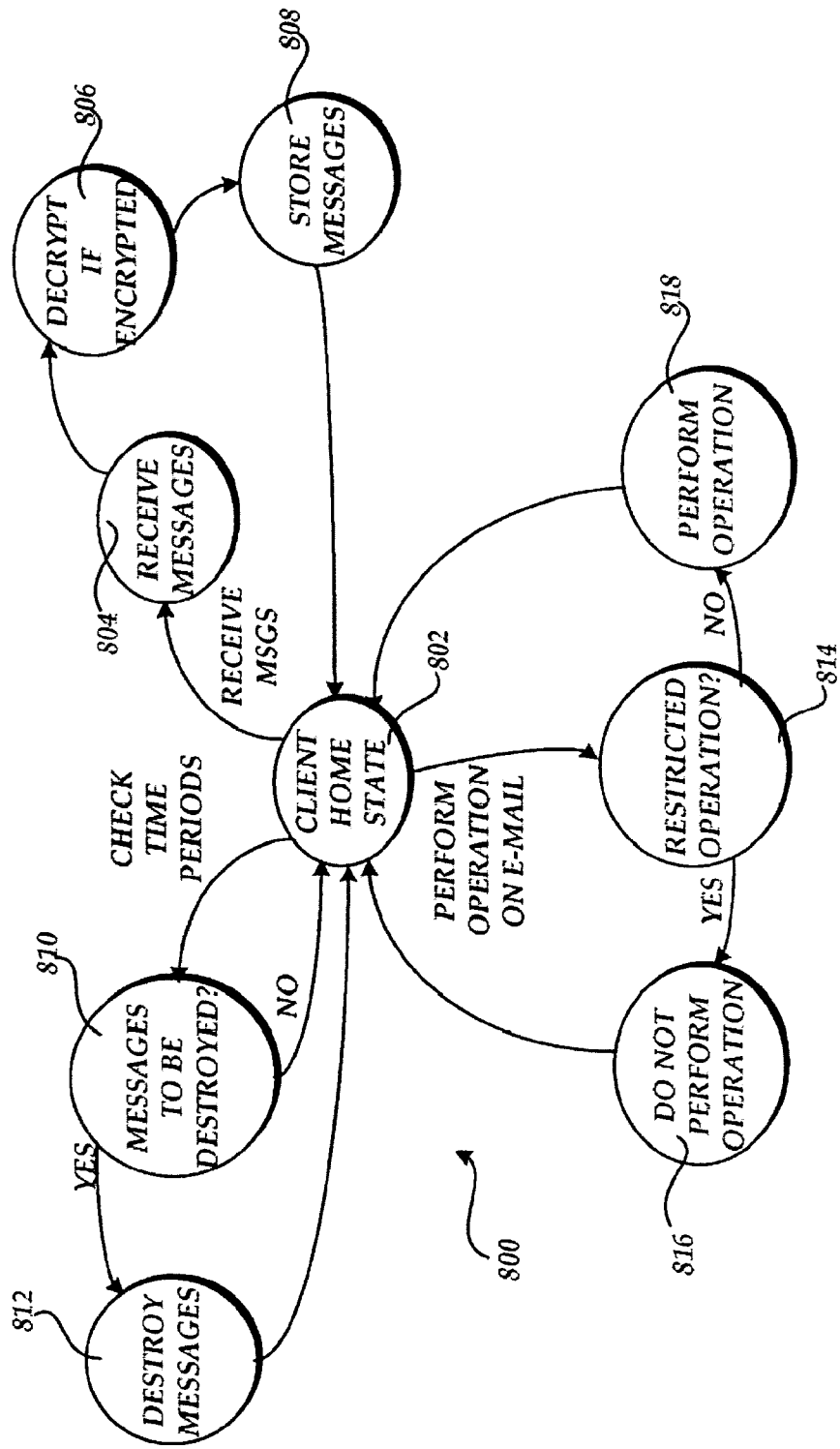
FIG. 8 is a state diagram illustrating aspects of the operation of an e-mail client application provided in an actual embodiment of the present invention.

Referring now to FIG. 8, a state machine 800 will be described illustrating aspects of the operation of the e-mail client application 302 according to one actual embodiment of the present invention. The state machine 800 begins at state 802, the e-mail client application 302 home state. In the home state 802, the e-mail client application displays the user interface window 402 shown in FIG. 4 and receives user input. As will be described in greater detail below, the e-mail client application 302 also receives messages in the home state 802 and determines whether self-destructing e-mail messages should be destroyed. In particular, from the home state 802, the e-mail client application 302 periodically transitions to state 804 where it contacts the e-mail server computer 102 and receives e-mail messages. The messages received from the e-mail server computer 102 may comprise self-destructing e-mail messages or non self-destructing e-mail messages.

Once messages have been received, the state machine 800 transitions from state 804 to state 806 where any encrypted e-mail messages received from the e-mail server computer 102 are decrypted. The state machine 800 then transitions to state 808, where the e-mail client application 302 stores the received e-mail messages in the e-mail database 304. From state 808, the e-mail client application 302 returns to the home state 802.

At the home state 802, the e-mail client application 302 also periodically checks to determine whether any self-destructing e-mail messages contained in the e-mail database 224 are scheduled to be destroyed. To perform this processing, the state machine 800 transitions from state 802 to state 810 where a determination is made as to whether any of the self-destructing e-mail messages contained in the e-mail database 304 should be destroyed. This determination may include comparing the time or date on which a particular self-destructing e-mail message should be destroyed with the current time maintained by the client computer 106A. If no self-destructing e-mail messages are to be destroyed, the state machine 800 returns to the home state 802. If, however, self-destructing e-mail messages are scheduled to be destroyed, the state machine 810 transitions to state 812. At state 812, the self-destructing e-mail message scheduled to be destroyed is deleted from the e-mail database 304 and removed from all portions of the system memory 204 and the mass storage device 208 of the client computer 106A. In this manner, each and every instance of the self-destructing e-mail message is deleted. From state 812, the state machine 800 returns to the home state 802.

While in the home state 802, the e-mail client application 302 may also receive a request from a user to perform an operation on one of the e-mail messages listed in the received e-mail list 404. For instance, the e-mail client application 302 may receive a request from a user via the selection of the user interface button 406F to print a selected e-mail message. When such a request to perform an operation is received, the state machine 800 transitions from state 802 to state 814. At state 814, the e-mail client application 302 makes a determination as to whether the requested operation is a restricted operation that should not be performed on the selected e-mail message. According to one embodiment of the present invention, the e-mail client application 302 determines whether a requested operation is a restricted operation by determining whether the selected e-mail message upon which the operation should be performed is a self-destructing e-mail message. If the e-mail upon which the operation is to be performed is a self-destructing e-mail message, any operation that would result in the duplication of any or all of the contents of the self-destructing e-mail message in any form will be restricted. For instance, operations for forwarding, saving, printing, pasting, cutting, copying, moving, and other similar operations may be restricted.

If, at state 814, the e-mail client application 302 determines that the requested operation is not a restricted operation, the state machine 800 transitions to state 818, where the requested operation is performed. If, however, at state 814 the e-mail client application 302 determines that the requested operation is a restricted operation, the state machine 800 will transition to state 816, where the requested operation is prohibited. A visual or audio indication may be provided to the user that the requested operation cannot be performed on a self-destructing e-mail message. From states 816 and 818 the state machine 800 returns to the e-mail client application home state 802.

Figure 9:
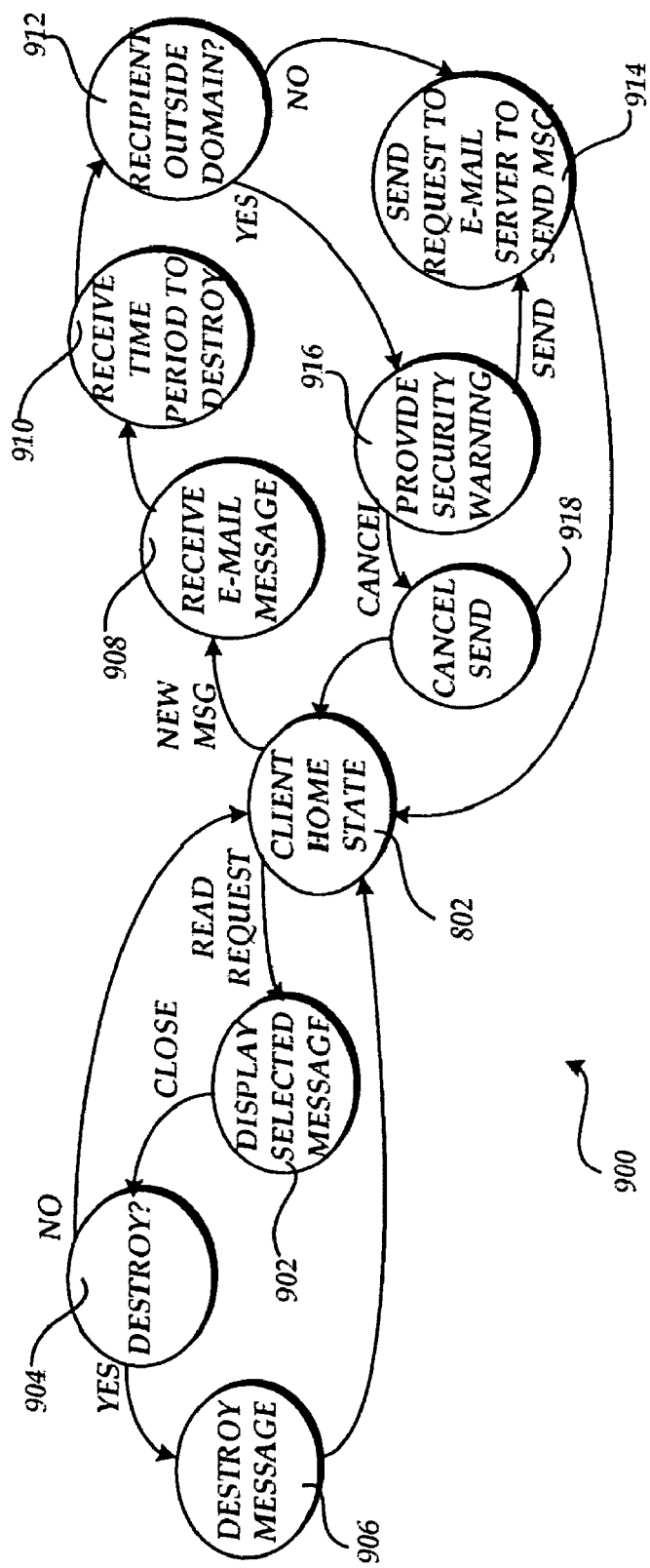
FIG. 9 is a state diagram illustrating additional aspects of the operation of an e-mail client application provided in an actual embodiment of the present invention.

Referring now to FIG. 9, a state machine 900 will be described that illustrates additional aspects of the operation of the e-mail client application 302. Like the state machine 800, the state machine 900 begins in the e-mail client application home state 802. If a request is received to send a new self-destructing e-mail message while the e-mail client application 302 is in the home state 802, the state machine 900 transitions from state 802 to state 908. At state 908, a user interface window for providing information regarding the recipients, subject, and message body is displayed to the user. An illustrative user interface window 502 for collecting this information is described above with reference to FIG. 5. Once this information has been received from the user, the state machine 900 transitions from state 908 to state 910.

At state 910, the time period within which the self-destructing e-mail message should be destroyed is also received from the user. As described above with reference to FIG. 6, this information may include an elapsed number of hours or days within which the message should be destroyed, a particular date on with which the message should be destroyed, or an indication from the user that the message should be destroyed immediately after it is read by the recipient. Once this information has been received from the sender, the state machine 900 continues to state 912.

At state 912, the e-mail client application 302 makes a determination as to whether any of the intended recipients of the new self-destructing e-mail message are outside the sender's home e-mail domain. If any of the intended recipients are outside the user's home e-mail domain, the state machine 900 transitions to state 916, where a security warning is provided to the sender as shown and described above with respect to FIG. 7. If the sender chooses to cancel the transmission of the message as a result of the security warning, the state machine 900 transitions from state 916 to state 918, where the self-destructing e-mail message is cancelled. The state machine then transitions from state 918 to the home state 802.

If, at state 912, the e-mail client application 302 determines that none of the intended recipients are beyond the sender's home e-mail domain, the state machine 912 transitions to state 914. Similarly, if at state 916, the e-mail client application 302 determines that the sender would like to continue sending the self-destructing e-mail message even after receiving the security warning, the state machine 900 transitions from state 916 to state 914.

At state 914, the e-mail client application 302 transmits a request to the e-mail server computer 102 to send the self-destructing e-mail message to the intended recipients. As a part of the request from the e-mail client application 302 to the e-mail server computer 102, the message body 506 and the time period within which the self-destructing electronic mail message should be destroyed are sent to the e-mail server computer 102. This information is then forwarded from the e-mail server computer 102 to each of the intended recipients and may be utilized by e-mail client applications 302 executing on each of the recipients' client computers to delete the self-destructing e-mail message at the appointed time. As will be described in greater detail below with respect to FIG. 10, this information may also be utilized at the e-mail server computer 102 to destroy all instances of the self-destructing e-mail message from the e-mail server computer 102. Once the request to transmit the self-destructing e-mail message has been transmitted to the e-mail server computer, the state machine 900 transitions from state 914 back to the home state 802.

While in the home state 802, the e-mail client application 302 may also receive a request from a user to read one of the messages identified in the received e-mail list 404. In response to such a request, the state machine 900 transitions from the home state 802 to state 902. At state 902, the e-mail message selected by the user is displayed in a conventional manner. When the displayed e-mail message is closed by the user, the state machine 900 transitions from state 902 to state 904. At state 904, the e-mail client application 302 makes a determination as to whether the displayed e-mail message should be destroyed. According to one embodiment of the present invention, this determination is made by the e-mail client application 302 by examining information associated with self-destructing e-mail messages that indicate that these messages should be destroyed after they have been read by the recipient. If such information is not associated with the displayed e-mail message, the message is simply closed and the state machine returns from state 904 to the home state 802.

If information is associated with the e-mail message indicating that it should be destroyed after being opened and closed, the state machine 900 transitions from state 904 to state 906. At state 906, the self-destructing e-mail message is deleted from the e-mail database 304. Other instances of the self-destructing e-mail message contained in the system memory 204 or the mass storage device 208 are also deleted. In this manner, all instances of the self-destructing e-mail message stored on the client computer 106A are eliminated. From state 906, the state machine 900 returns to the home state 802 where additional requests may be processed.

Figure 10:
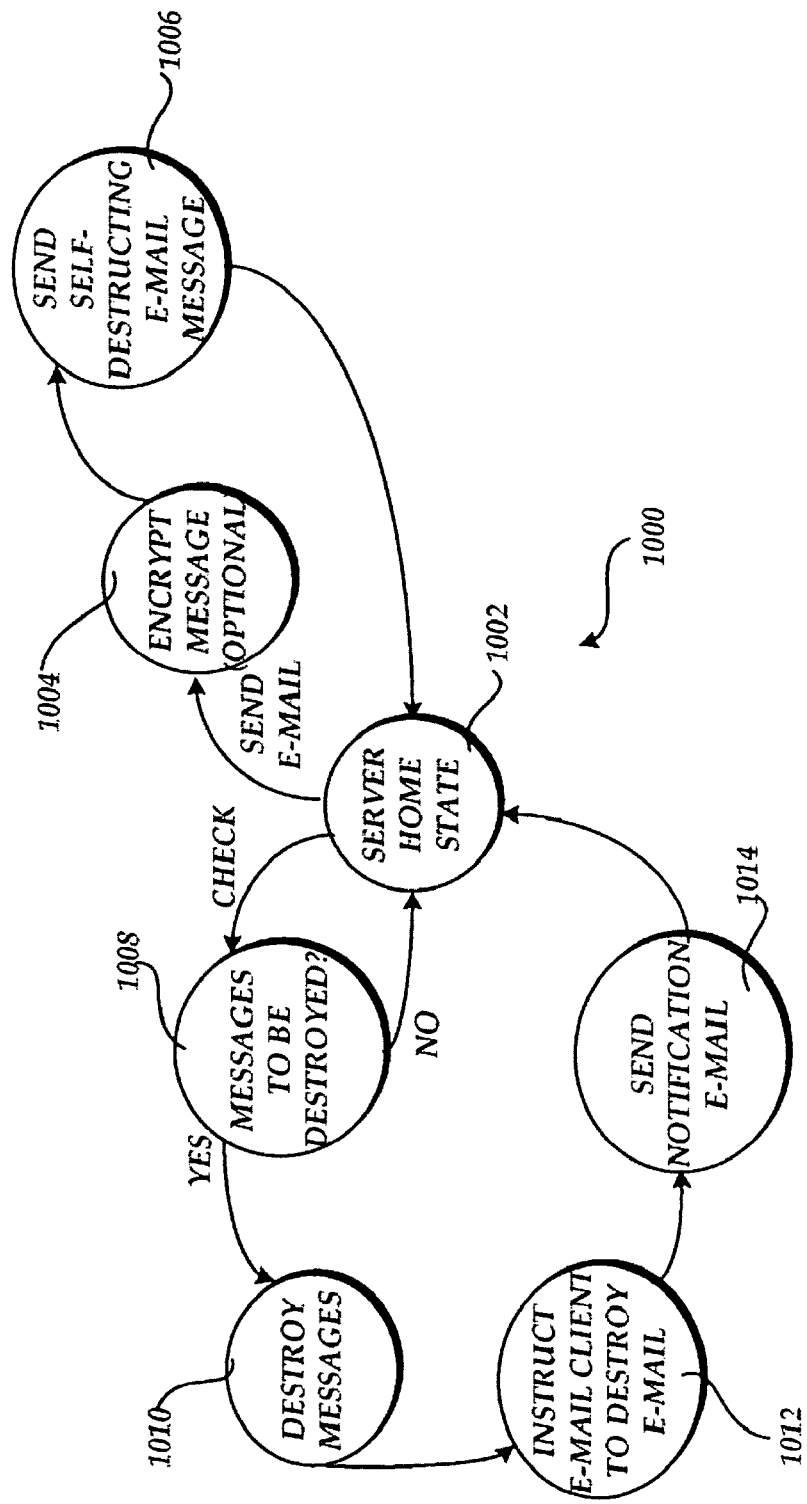
FIG. 10 is a state diagram illustrating aspects of the operation of an e-mail server application provided in an actual embodiment of the present invention.

Referring now to FIG. 10, a state machine 1000 will be described that illustrates additional aspects of the operation of the e-mail server application 222. The state machine 1000 begins at state 1002, the e-mail server application 222 home state. The e-mail server application 222 performs a variety of processing tasks while in the home state 1002, including receiving and forwarding e-mail messages and determining whether any self-destructing e-mail messages should be destroyed from the e-mail server computer 102. In particular, if the e-mail server application 222 receives a request from an e-mail client application 302 to transmit a self-destructing e-mail message, the state machine 1000 transitions from state 1002 to state 1004.

At state 1004, the e-mail server application 222 encrypts the received message if the sender has indicated that the message should be encrypted. As mentioned above, encrypting a self-destructing e-mail message ensures that only e-mail client applications that support the timely destruction of such e-mail messages can read these messages. Alternatively, encryption of the e-mail message may be performed at the e-mail client application 302 prior to sending the message. From state 1004, the state machine 1000 continues to state 1006, where the e-mail server 222 transmits the self-destructing e-mail message to each of the intended recipients identified by the sender. The state machine 1000 then transitions from state 1006 back to the e-mail server application home state 1002.

The e-mail server application 222 also periodically checks to determine whether any self-destructing e-mail messages should be deleted from the e-mail server computer 102. This ensures that all instances of the e-mail will be destroyed from both the client computer 106A and the e-mail server computer 102. When such a check is to be performed, the state machine 1000 transitions to state 1008. At state 1008, the e-mail server application 222 determines whether any messages to be destroyed are contained in the e-mail database 224. If no messages are to be destroyed, the state machine returns from state 1008 to the home state 1002. If messages are contained in the e-mail database 224 that are scheduled for destruction, the state machine 1000 transitions from state 1008 to state 1010. At state 1010, all self-destructing e-mail messages that are scheduled to be destroyed contained in the e-mail database 224 are removed. Additionally, the e-mail server computer 102 may remove all instances of the self-destructing e-mail message from the system memory 204 or other locations on the mass storage device 208.

Once all instances of the self-destructing e-mail messages have been destroyed from the e-mail server computer 102, the state machine 1000 transitions from state 1010 to state 1012. At state 1012, the e-mail server application 222 may send a notification to the recipients and the senders instructing their e-mail client applications 302 to destroy all instances of the e-mail message. This notification may be performed as a backup to the functionality provided by the e-mail client application 302 for destroying instances of the self-destructing e-mail message.

From state 1012, the state machine 1000 transitions to state 1014. At state 1014, the e-mail server application 222 sends a notification e-mail message to each of the recipients of the deleted self-destructing e-mail message. As mentioned above, the notification e-mail includes the identity of the sender of the self-destructing e-mail message along with an indication that the self-destructing e-mail message was sent but destroyed. In this manner, a recipient may learn of the fact that the e-mail message was sent but destroyed. The state machine 1000 then returns from state 1014 to the home state 1002, where the e-mail server application 222 continues its processing.

In view of the above, it should be appreciated that embodiments of the present invention provide a method, system, computer-controlled apparatus, and computer-readable medium for providing self-destructing e-mail messages. The above specification, examples and data provide a complete description of the manufacture and use of the composition of the invention. Since many embodiments of the invention can be made without departing from the spirit and scope of the invention, the invention is defined by the claims hereinafter appended.

We claim:

1. A method for providing self-destructing electronic mail messages, comprising:

receiving a request to send a self-destructing electronic mail message, the request comprising a message body and a time period within which the self-destructing electronic mail message is to be destroyed, the self-destructing electronic mail message including a designation that prevents an electronic mail client of a first recipient of the self-destructing electronic mail message in a home domain of a sender of the self-destructing electronic mail message from performing an operation that results in duplication of contents of the self-destructing electronic mail message, wherein a plurality of operations that is prevented includes forwarding the self-destructing electronic mail message to a second recipient, printing the self-destructing electronic mail message, copying contents of the self-destructing electronic mail message into memory, and pasting the contents of the self-destructing electronic mail message from memory into a new document;

presenting a security warning when any intended recipient of the self-destructing electronic mail message is located beyond the home domain of the sender;

transmitting, in response to an indication that the sender selected to proceed with transmitting the self-destructing electronic mail message to a network beyond the home domain of the sender of the self-destructing electronic mail message, the request to an electronic mail client application in the network beyond the home domain; and after transmitting the self-destructing electronic mail message and after expiration of the time period, deleting, by an electronic mail server, any instances of the self-destructing electronic mail message that are being stored at the electronic mail server.

2. The method of claim 1, wherein the time period comprises an indication that the self-destructing electronic mail message should be destroyed after a specified number of hours.

3. The method of claim 1, wherein the time period comprises an indication that the self-destructing electronic mail message should be destroyed after a specified number of days.

4. The method of claim 1, wherein the time period comprises an indication that the self-destructing electronic mail message should be destroyed on a particular date.

5. The method of claim 1, wherein determining whether the self-destructing electronic mail message can be destroyed comprises identifying the self-destructing electronic mail message destruction date.

6. The method of claim 1, wherein receiving the request to read the self-destructing electronic mall message comprises displaying the selected message.

7. The method of claim 6, wherein receiving the request to read the self-destructing electronic mail message further comprises identifying the self-destructing electronic mail message operation restrictions.

8. The method of claim 6, wherein receiving the request to read the self-destructing electronic mail message further comprises determining whether the self-destructing electronic mail message can be destroyed after the self-destructing electronic mail message is closed.

9. The method of claim 1, further comprises sending a notification from an electronic mail server application to the client application to destroy all instances of the self-destructing electronic mail message.

10. A method for providing self-destructing electronic mail messages, the method comprising:

receiving, by an electronic mail server, a request to send a first self-destructing electronic mail message, the request comprising a message body and a time period within which the first self-destructing electronic mail message is to be destroyed, the first self-destructing electronic mail message including a designation that prevents an electronic mail client of a first recipient of the first self-destructing electronic mail message in a home domain of a sender of the first self-destructing electronic mail message from performing an operation that results in duplication of contents of the first self-destructing electronic mail message, wherein a plurality of operations that is prevented includes forwarding the first self-destructing electronic mail message to a second recipient, printing the first self-destructing electronic mail message, copying contents of the first self-destructing electronic mail message into memory, and pasting the contents of the first self-destructing electronic mail message from memory into a new document;

presenting, by the electronic mail server, a security warning when any intended recipient of the first self-destructing electronic mail message is located beyond the home domain of a sender of the first self-destructing electronic mail message;

transmitting, in response to an indication that the sender selected to proceed with transmitting the first self-destructing electronic mail message, the first self-destructing electronic mail message to an intended recipient;

after transmitting the first self-destructing electronic mail message and after expiration of the time period, deleting, by the electronic mail server, any instances of the first self-destructing electronic mail message that are being stored at the electronic mail server;

receiving, at the electronic mail server, a second self-destructing electronic mail message that includes a second message body and a second time period within which the second self-destructing electronic mail message is to be destroyed, the second self-destructing electronic mail message including a designation that prevents a second electronic mail client of a recipient of the second self-destructing electronic mail message in a home domain of a respective sender of the second self-destructing electronic mail message from performing an operation that results in duplication of contents of the second self-destructing electronic mail message, wherein a plurality of operations that is prevented includes forwarding the second self-destructing electronic mail message to a different recipient, printing the second self-destructing electronic mail message, copying contents of the second self-destructing electronic mail message into memory, and pasting the contents of the second self-destructing electronic mail message from memory into a new document;

storing the second self-destructing electronic mail message;

determining whether the second self-destructing electronic mail message can be destroyed;

identifying the second self-destructing electronic mail message destruction date; and facilitating destruction of the second self-destructing electronic mail message.

11. The method of claim 10, wherein the second time period comprises an indication that the second self-destructing electronic mail message should be destroyed after at least one of the following: specified number of hours and specified number of days.

12. The method of claim 10, wherein the second time period comprises an indication that the second self-destructing electronic mail message should be destroyed on a particular date.

13. The method of claim 10, further comprising receiving a request to read the second self-destructing electronic mail message.

14. The method of claim 13, wherein receiving the request to read the second self-destructing electronic mail message further comprises identifying second self-destructing electronic mail message operation restrictions.

15. The method of claim 13, wherein receiving the request to read the second self-destructing electronic mail message further comprises determining whether the second self-destructing electronic mail message can be destroyed after the second self-destructing electronic mail message is closed.

16. The method of claim 10, further comprises sending a notification from an electronic mail server application to a client application to destroy all instances of second self-destructing electronic mail message.

17. A system for providing self-destructing electronic mail messages, the system comprising:
   a memory component that stores an electronic mail server application, the electronic mail server application configured to perform at least the following:
      receive a request to transmit a self-destructing electronic mail message, the self-destructing electronic mail message including a designation that prevents an electronic mail client of a first recipient of the self-destructing electronic mail message in a home domain of a sender of the self-destructing electronic mail message from performing an operation that results in duplication of contents of the self-destructing electronic mail message, wherein a plurality of operations that is prevented includes forwarding the self-destructing electronic mail message to a second recipient, printing the self-destructing electronic mail message, copying contents of the self-destructing electronic mail message into memory, and pasting the contents of the self-destructing electronic mail message from memory into a new document;
      present a security warning when an intended recipient of the self-destructing electronic mail message is located beyond the home domain of the sender;
      transmit the self-destructing electronic mail message to an electronic mail client application; and
      after transmitting the self-destructing electronic mail message and after expiration of the time period, delete any instances of the self-destructing electronic mail message that are being stored by the electronic mail server application.

18. The system of claim 17, wherein the electronic mail server application is operative to transmit a notification that the self-destructing electronic mail message is destroyed.

19. The system of claim 17, wherein the electronic mail server application is operative to send a notification to a sender's client application and a recipient's client application to destroy all instances of the self-destructing electronic mail message.

20. The method of claim 17, wherein the electronic mail server application is operative to receive a request to read the self-destructing electronic mail message.

\* \* \* \* \*